US012689066B2

(12) United States Patent
Sung et al.

(10) Patent No.: US 12,689,066 B2
(45) Date of Patent: Jul. 21, 2026

(54) SECONDARY BATTERY

(71) Applicant: Samsung SDI Co., Ltd., Yongin-si (KR)

(72) Inventors: Geon Kyu Sung, Yongin-si (KR); Dong Jin An, Yongin-si (KR); Ho Jae Lee, Yongin-si (KR); Hyun Ki Jung, Yongin-si (KR); Ye Jin Cho, Yongin-si (KR); Yeon Hwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 513 days.

(21) Appl. No.: 18/253,378

(22) PCT Filed: Nov. 11, 2021

(86) PCT No.: PCT/KR2021/016459
§ 371 (c)(1),
(2) Date: May 17, 2023

(87) PCT Pub. No.: WO2022/108244
PCT Pub. Date: May 27, 2022

(65) Prior Publication Data
US 2023/0420744 A1     Dec. 28, 2023

(30) Foreign Application Priority Data

Nov. 19, 2020    (KR) ........................ 10-2020-0155894

(51) Int. Cl.
*H01M 10/0587* (2010.01)
*H01M 4/13* (2010.01)
(Continued)

(52) U.S. Cl.
CPC ......... *H01M 10/0587* (2013.01); *H01M 4/13* (2013.01); *H01M 10/0468* (2013.01);
(Continued)

(58) Field of Classification Search
CPC ......... H01M 10/0587; H01M 10/0468; H01M 10/04; H01M 10/0422; H01M 10/0431;
(Continued)

(56) References Cited

U.S. PATENT DOCUMENTS 8,980,464 B2    3/2015   Kim et al.
9,865,848 B2    1/2018   Kim et al.
(Continued)

FOREIGN PATENT DOCUMENTS

CN    103597635 A    2/2014
CN    104659443 A    5/2015
(Continued)

OTHER PUBLICATIONS

International Search of PCT/KR2021/016459, Feb. 18, 2022, 5 pages.
(Continued)

*Primary Examiner* — Eugenia Wang
(74) *Attorney, Agent, or Firm* — Womble Bond Dickinson (US) LLP

(57) ABSTRACT

A technical problem to be solved according to the present disclosure is to provide a secondary battery capable of minimizing contact resistance between a base finish part of an electrode assembly and a can even when a deviation in the winding radius of the electrode assembly occurs, by positioning a swelling tape inside the electrode assembly. To this end, the present disclosure provides a secondary battery including: a cylindrical can, an electrode assembly having a base finish part electrically contacting the cylindrical can; a cap assembly sealing the electrode assembly by blocking the cylindrical can; and a swelling tape positioned inside the base finish part to press the base finish part into the cylindrical can.

12 Claims, 8 Drawing Sheets

(51) Int. Cl.

| | |
|---|---|
| *H01M 10/04* | (2006.01) |
| *H01M 50/107* | (2021.01) |
| *H01M 50/152* | (2021.01) |
| *H01M 50/531* | (2021.01) |

(52) U.S. Cl.
CPC ....... *H01M 50/107* (2021.01); *H01M 50/152* (2021.01); *H01M 50/531* (2021.01)

(58) Field of Classification Search
CPC .. H01M 10/0481; H01M 4/13; H01M 50/107; H01M 50/152; Y02P 70/50
See application file for complete search history.

(56) References Cited

U.S. PATENT DOCUMENTS

| | | | |
|---|---|---|---|
| 10,230,084 | B2 | 3/2019 | Kim et al. |
| 2008/0305395 | A1 | 12/2008 | Hirose et al. |
| 2012/0115025 | A1 | 5/2012 | Kim et al. |
| 2012/0301786 | A1 | 11/2012 | Takamuku et al. |
| 2014/0106207 | A1 | 4/2014 | Kim et al. |
| 2015/0147640 | A1 | 5/2015 | Kim et al. |
| 2019/0252732 | A1 | 8/2019 | Park et al. |
| 2020/0235369 | A1 | 7/2020 | Jeong et al. |
| 2023/0411811 | A1* | 12/2023 | Park .................... H01M 10/04 |

FOREIGN PATENT DOCUMENTS

| | | |
|---|---|---|
| CN | 109037790 A | 12/2018 |
| CN | 111418082 A | 7/2020 |
| JP | 2001-273933 A | 10/2001 |
| KR | 10-0719725 B1 | 5/2007 |
| KR | 10-1198294 B1 | 11/2012 |
| KR | 10-2014-0074220 A | 6/2014 |
| KR | 10-2015-0111723 A | 10/2015 |
| KR | 10-1650660 B1 | 8/2016 |
| KR | 10-2018-0008037 A | 1/2018 |
| KR | 10-2018-0041528 A | 4/2018 |
| KR | 10-2019-0098560 A | 8/2019 |
| KR | 10-2020-0047183 A | 5/2020 |

OTHER PUBLICATIONS

EPO Extended European Search Report dated Dec. 5, 2024, issued in European Patent Application No. 21895013.7 (8 pages).
Chinese Notification of First Office Action, for Patent Application No. 202180077354.4, dated May 27, 2026, 7 pages.

* cited by examiner

SECONDARY BATTERY

TECHNICAL FIELD

The present disclosure relates to a secondary battery.

BACKGROUND ART

In general, a secondary battery may include an electrode assembly, a can accommodating the electrode assembly and an electrolyte, and a cap assembly coupled to an upper opening of the can to seal the can and to allow current generated in the electrode assembly to flow to an external device.

According to the advances in the performance of electronic/electrical devices, secondary batteries installed in the devices are also required to have higher output and higher capacity. For high output and high capacity secondary batteries, for example, a base finishing structure of an electrode assembly capable of efficiently using the inner space of a can is being developed. Such a base finishing structure occupies less inner space of the can, thereby increasing the efficiency of using the inner space of the can, and also serves to transfer current and heat to the can.

However, since, in an electrode assembly, a deviation in the winding radius may usually exist after a winding process, contact resistance between the base finishing structure and the can may not be constant for respective secondary batteries, and accordingly, there may be a problem in that a great deviation exists in the current transfer rate and the heat transfer rate of the respective secondary batteries.

The above information disclosed in this Background section is only for enhancement of understanding of the background of the invention and therefore it may contain information that does not constitute prior art.

DESCRIPTION OF EMBODIMENTS

Technical Problem

The present disclosure provides a secondary battery capable of minimizing contact resistance between a base finish part of an electrode assembly and a can even when a deviation in the winding radius of the electrode assembly occurs, by positioning a swelling tape inside the electrode assembly.

Solution to Problem

An exemplary secondary battery according to the present disclosure may include: a cylindrical can; an electrode assembly having a base finish part electrically contacting the cylindrical can; a cap assembly sealing the electrode assembly by blocking the cylindrical can; and a swelling tape positioned inside the base finish part to press the base finish part to the cylindrical can.

The can may include a bottom portion and a side portion extending from the bottom portion, and the swelling tape may press the base finish part to the side portion.

The electrode assembly may include a first electrode plate, a separator positioned on the first electrode plate, and a second electrode plate positioned on the separator, wherein the first electrode plate, the separator, and the second electrode plate are laminated and wound, and the base finish part may be provided by wrapping the outermost periphery of the electrode assembly with the first electrode plate.

The first electrode plate may include a conductive first base having inner and outer surfaces, a coating portion provided by coating a first active material on the inner and outer surfaces of the first base, and a non-coating portion provided by not coating the first active material on the inner and outer surfaces of the first base, and the non-coating portion may cover the outermost periphery of the electrode assembly.

The base finish part may include the non-coating portion.

The swelling tape may be adhered to an inner surface of the base finish part.

The swelling tape may be interposed between the inner surface of the base finish part and the separator.

The first electrode plate may further include a first tab welded to the first base, and the first tab may be electrically connected to the cylindrical can.

A length of the swelling tape may be 1% to 100% of the length of the non-coating portion.

A winding-turn length of the swelling tape may be 0.1-1 turn compared to the winding-turn length of the base finish part.

The swelling tape may absorb an electrolyte to be swollen.

The swelling tape may include an acrylic binder.

Advantageous Effects of Disclosure

The present disclosure is to provide a secondary battery capable of minimizing contact resistance between a base finish part of an electrode assembly and a can even when a deviation in the winding radius of the electrode assembly occurs, by positioning a swelling tape inside the electrode assembly. That is, in the present disclosure, the swelling tape positioned inside the electrode assembly presses the base finish part to the can, and thus, the base finish part of the electrode assembly strongly adheres to/is in contact with the can, thereby improving electrical/thermal connection state between the electrode assembly and the can.

MODE OF DISCLOSURE

Figure 1A:
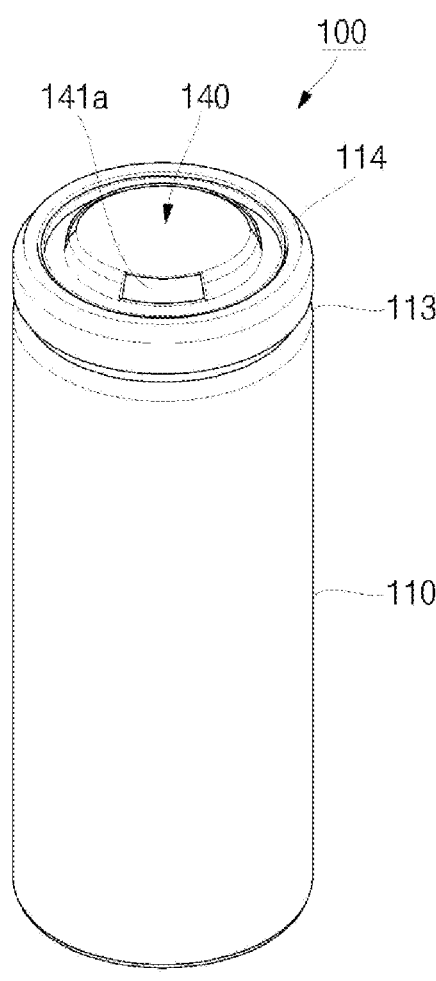
FIGS. 1A, 1B, and 1C are a perspective view, a cross-sectional view, and an exploded perspective view illustrating an exemplary secondary battery according to the present disclosure.

Examples of the present disclosure are provided to more completely explain the present disclosure to those skilled in the art, and the following examples may be modified in various other forms. The present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
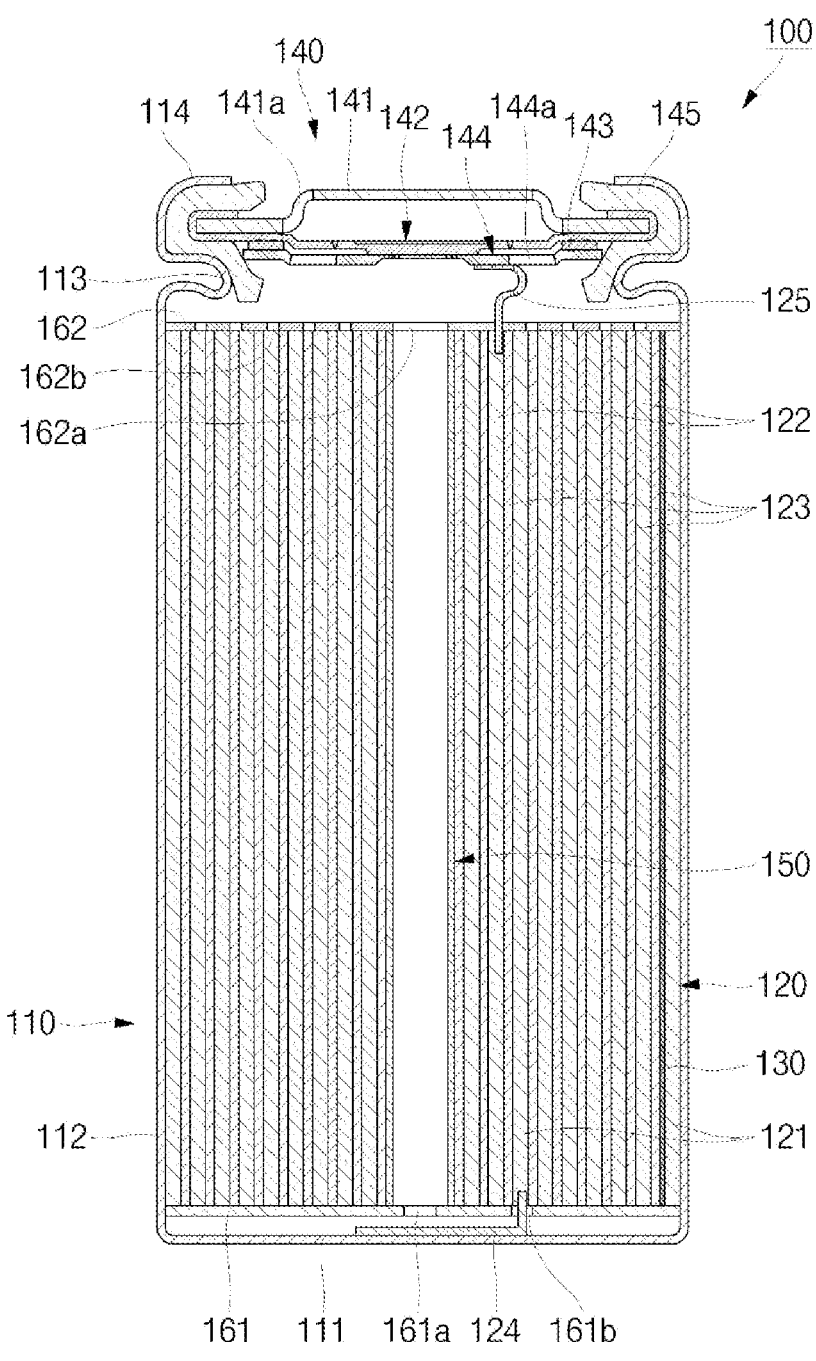
Figure 1C:
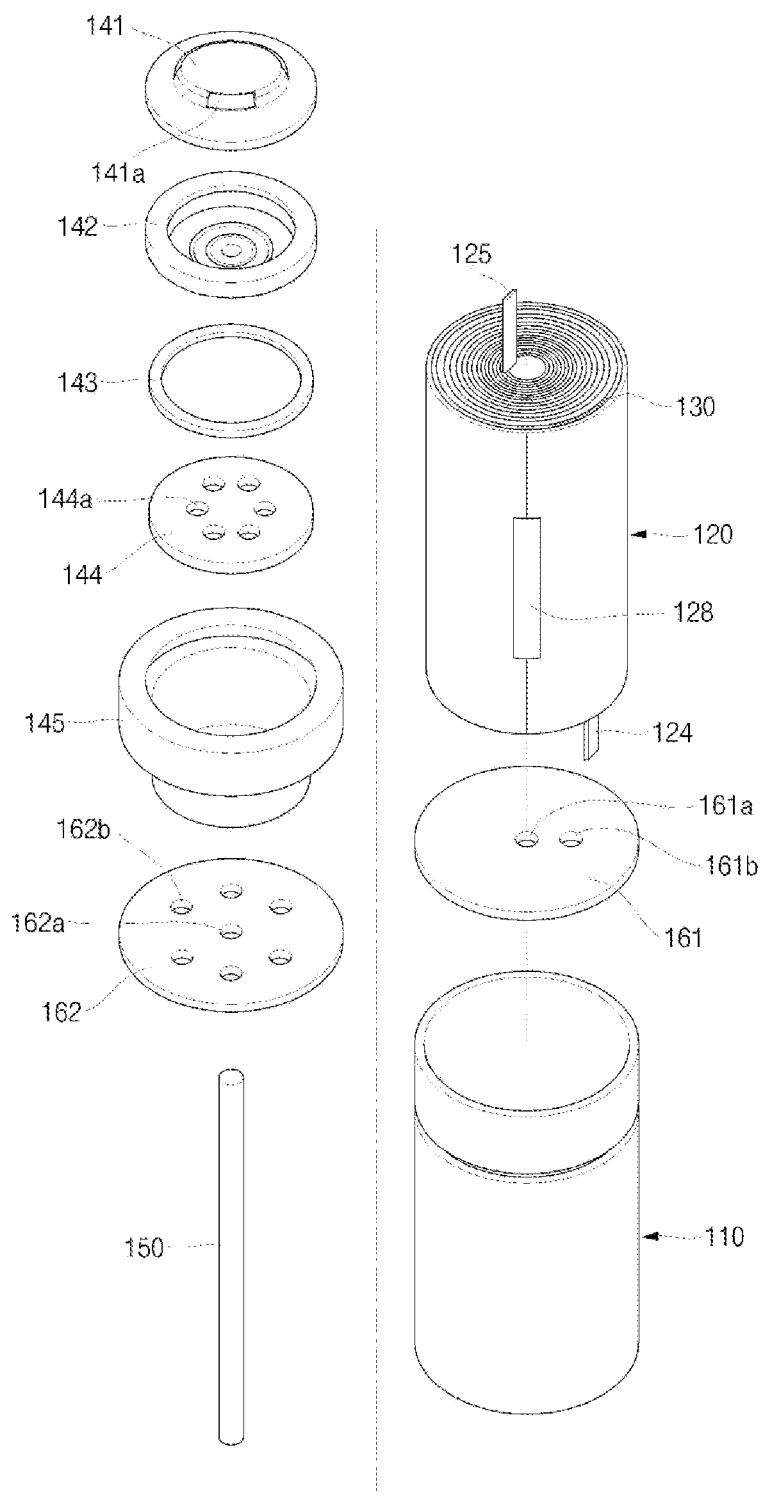

Referring to FIGS. 1A, 1B, and 1C, a perspective view, a cross-sectional view, and an exploded perspective view illustrating an exemplary secondary battery 100 according to the present disclosure are shown.

As shown in FIGS. 1A, 1B, and 1C, the secondary battery 100 according to the present disclosure may include a cylindrical can 110, a cylindrical electrode assembly 120, a swelling tape 130, and a cap assembly 140. In some examples, the secondary battery 100 may further include a center pin 150 coupled to the electrode assembly 120.

The cylindrical can 110 may include a circular bottom portion 111 and a cylindrical side portion 112 extending a predetermined length upward from the bottom portion 111. During assembling of the secondary battery, a top portion of the cylindrical can 110 may be opened. Therefore, during assembling of the secondary battery, the electrode assembly 120 may be inserted into the cylindrical can 110, and an electrolyte may then be injected into the cylindrical can 110. In some examples, the cylindrical can 110 may include steel, a steel alloy, nickel, a nickel alloy, aluminum, or an aluminum alloy. In some examples, in order to prevent the electrode assembly 120 and the cap assembly 140 from escaping to the outside, the cylindrical can 110 may include a beading part 113 inwardly recessed at the bottom of the cap assembly 140 and a crimping part 114 inwardly bent at the top thereof.

The electrode assembly 120 may be accommodated inside the cylindrical can 110. The electrode assembly 120 may include a first electrode plate 121 coated with a first active material (e.g., graphite, carbon, etc.) on a conductive first base, a second electrode plate 122 coated with a second active material (e.g., transition metal oxide ($LiCoO_2$, $LiNiO_2$, $LiMn_2O_4$, etc.) on a conductive second base, and a separator 123 positioned between the first electrode plate 121 and the second electrode plate 122 to prevent a short circuit between them and to allow only lithium ions to move. In some examples, the first electrode plate 121, the separator 123, and the second electrode plate 122 may be stacked and wound into a substantially cylindrical shape. In some examples, the first base of the first electrode plate 121 may include copper (Cu), nickel (Ni), or an alloy of copper and nickel, the second base of the second electrode plate 122 may include aluminum (Al), and the separator 123 may include polyethylene (PE) or polypropylene (PP). In some examples, a first tab 124 protruding downward by a certain length may be welded to the first electrode plate 121, and a second tab 125 protruding upward by a certain length may be welded to the second electrode plate 122. However, the reverse is also possible. In some examples, the first tab 124 may include copper, nickel, or an alloy of copper and nickel, and the second tab 125 may include aluminum.

In some examples, the first tab 124 of the electrode assembly 120 may be welded to the bottom portion 111 of the cylindrical can 110. Accordingly, the cylindrical can 110 may operate as a first pole (e.g., an anode). Of course, on the contrary, the second tab 125 may be welded to the bottom portion 111 of the cylindrical can 110, and in this case, the cylindrical can 110 may operate as a second pole (e.g., a cathode).

The swelling tape 130 may be positioned inside the electrode assembly 120. In some examples, the swelling tape 130 may be positioned inside the first electrode plate 121 covering the outermost part of the electrode assembly 120. In some examples, the swelling tape 130 may be interposed between the separator 123 and the first electrode plate 121 covering the outermost part of the electrode assembly 120. In some examples, the first electrode plate 121 of the electrode assembly 120 may come into close contact with/be in contact with the side portion 112 of the cylindrical can 110. Specifically, the first base of the first electrode plate 121 may directly come into close contact with/be in contact with the side portion 112 of the cylindrical can 110. In this way, the first base in close contact/contact with the side portion 112 may be defined as a base finish part. The organic bonding relationship between each of the first base, the base finish part, and the swelling tape will be described again below.

In some examples, by finishing a winding end provided at the outermost part of the electrode assembly 120 with a finishing tape 128, the electrode assembly 120 may not be unwound after winding the electrode assembly 120. In some examples, the finishing tape 128 may not be used, and the swelling tape 130 may replace the role of the finishing tape. In some examples, the swelling tape 130 may be positioned inside the electrode assembly 120 and may extend to the winding end, and thus may serve as a finishing tape to prevent the wound electrode assembly 120 from being unwound.

In some examples, a first insulation plate 161 coupled to the cylindrical can 110 and having a first hole 161*a* in the center and a second hole 161*b* outside thereof may be interposed between the electrode assembly 120 and the bottom portion 111. The first insulation plate 161 may prevent the electrode assembly 120 from electrically contacting the bottom portion 111 of the cylindrical can 110. In some examples, the first insulation plate 161 may prevent the second electrode plate 122 of the electrode assembly 120 from electrically contacting the bottom portion 111. In some examples, when a large amount of gas is generated due to abnormality of the secondary battery, the first hole 161*a* may allow the gas to quickly move upward through the center pin 150, and the second hole 161*b* may allow the first tab 124 to pass therethrough and be welded to the bottom portion 111.

In some examples, a second insulation plate 162 coupled to the cylindrical can 110 and having a first hole 162*a* in the center and a plurality of second holes 162*b* outside thereof may be interposed between the electrode assembly 120 and the cap assembly 140. The second insulation plate 162 may prevent the electrode assembly 120 from electrically contacting the cap assembly 140. In some examples, the second insulation plate 162 may prevent the first electrode plate 121 of the electrode assembly 120 from electrically contacting the cap assembly 140. In some examples, when a large amount of gas is generated due to abnormality of the secondary battery, the first hole 162*a* may allow the gas to quickly move to the cap assembly 140, and the second hole 162*b* may allow the second tab 125 to pass therethrough and be welded to the cap assembly 140. In addition, during an electrolyte injection process, the remaining second holes 162*b* may allow an electrolyte to quickly flow to the cylindrical can 110.

In some examples, the first holes 161*a* and 162*a* of the first and second insulation plates 161 and 162 may be formed to have smaller diameters than the center pin 150, thereby preventing the center pins 150 from electrically contacting the bottom portion 111 of the cylindrical can 110 or the cap assembly 140 due to an external impact.

In some examples, the center pin 150 may have a shape of a hollow circular pipe and may be coupled to approximately the center of the electrode assembly 120. In some examples, the center pin 150 may include steel, a steel alloy, aluminum, an aluminum alloy, or polybutylene terephthalate. The center pin 150 serves to suppress deformation of the electrode assembly 120 during charging and discharging of battery, and serves as a passage for gas generated inside the secondary battery. In some cases, the center pin 150 may be omitted.

The cap assembly 140 may include a cap-up 141 having a plurality of through holes 141*a*, a safety vent 142 positioned under the cap-up 141, a connection ring 143 positioned under the safety vent 142, and a cap-down 144 positioned under the connection ring 143, having a plurality of through holes 144*a*, and electrically connected to the second tab 125. In some examples, the cap assembly 140 may further include an insulation gasket 145 insulating the cap-up 141, the safety vent 142, and the cap-down 144 from the side portion 112 of the cylindrical can 110.

In some examples, the insulation gasket 145 may be substantially compressed between the beading part 113 and the crimping part 114 formed on the side portion 112 of the cylindrical can 110. In some examples, the through holes 141*a* of the cap-up 141 and the through holes 144*a* of the cap-down 144 may discharge internal gas to the outside when abnormal internal pressure is generated inside the cylindrical can 110. In some examples, the internal gas may invert the safety vent 142 upward through the through holes 144*a* of the cap-down 144, so that the safety vent 142 is electrically separated from the cap-down 144, and the safety vent 142 is then ruptured, and thus, the internal gas may be discharged to the outside through the through holes 141*a* of the cap-up 141.

In some examples, an electrolyte (not shown) may be injected into the cylindrical can 110, which allows lithium ions, generated by an electrochemical reaction in the first electrode plate 121 and the second electrode plate 122 inside the battery, to move during charging and discharging. Such an electrolyte solution may include a non-aqueous organic electrolyte solution that is a mixture of a lithium salt and a high-purity organic solvent. In some examples, the electrolyte may include a polymer using a polymer electrolyte or a solid electrolyte.

Figure 2:
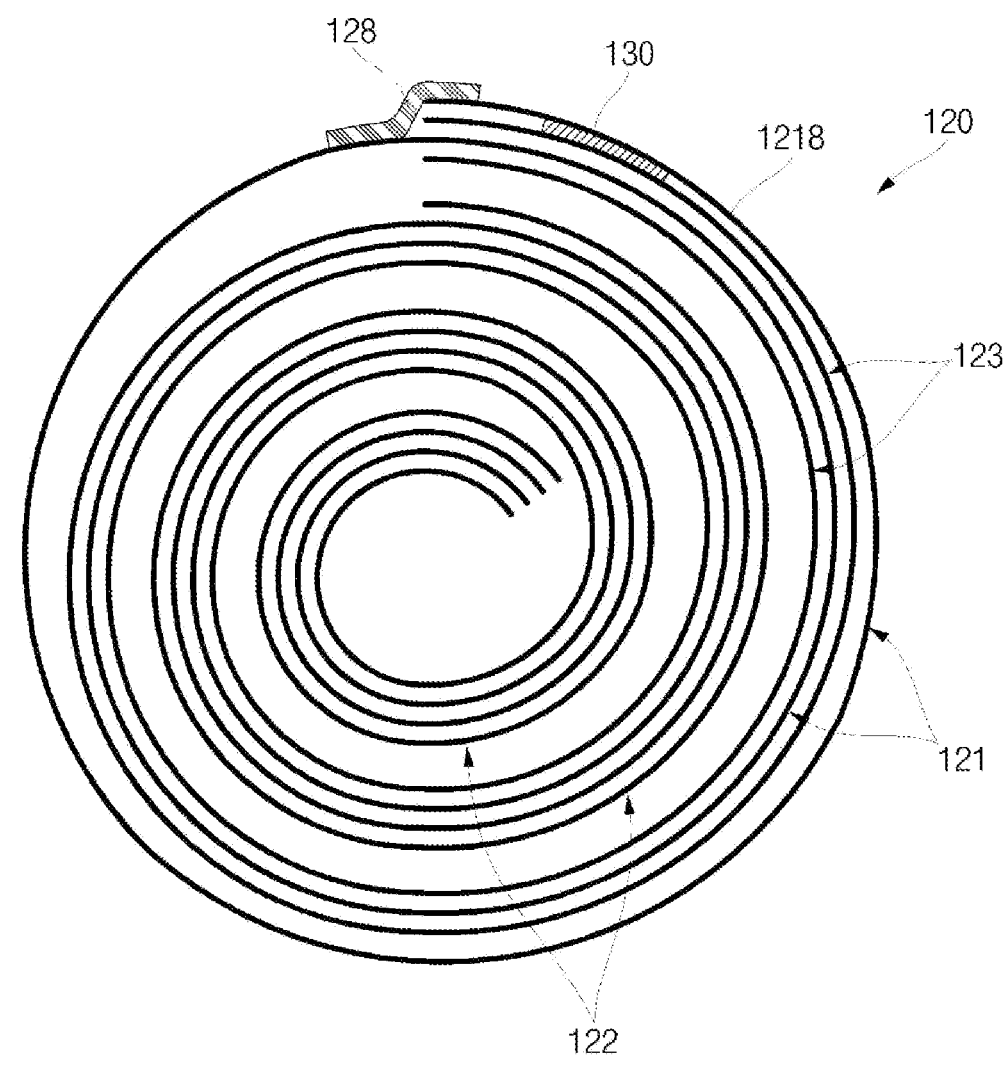
FIG. 2 is a longitudinal cross-sectional view illustrating an exemplary electrode assembly of an exemplary secondary battery according to the present disclosure.

Referring to FIG. 2, a longitudinal cross-sectional view of an electrode assembly 120 of a secondary battery 100 according to the present disclosure is shown. Here, for the purpose of understanding the present disclosure, the electrode assembly 120 is shown exaggerated. For example, the first electrode plate 121, the separator 123, and the second electrode plate 122 are in close contact with each other, but are shown as being spaced apart from each other, for convenience of understanding.

As shown in FIG. 2, the electrode assembly 120 may include the first electrode plate 121, the separators 123 positioned on the upper and lower surfaces of the first electrode plate 121, respectively, and the second electrode plate 122 positioned on any one of the separators 123. In addition, the electrode assembly 120 may be wound in a substantially circular shape while the first electrode plate 121, the separators 123, and the second electrode plate 122 are stacked, thereby finally having a substantially cylindrical shape. In some examples, a portion where winding starts (an approximately central region of the wound electrode assembly 120) may be defined as a winding leading edge, and a portion where winding finishes (ends) (approximately the outermost region of the wound electrode assembly 120 may be defined as a winding trailing edge. In some examples, the entire outermost region of the electrode assembly 120, including the winding trailing edge, may be defined as a base finish part 1218, and the base finish part 1218 may be in electrical/mechanical/thermal contact/close contact with the cylindrical can 110 (i.e., the side portion 112). In some examples, the first electrode plate 121 may include the base finish part 1218, and thus the first electrode plate 121 may be in electrical/mechanical/thermal contact/close contact with the side portion 112 of the cylindrical can 110.

In some examples, the finishing tape 128 may be omitted, and the swelling tape 130 may replace the role of the finishing tape. Here, the swelling tape 130 preferably extends from the inside of the electrode assembly 120 to the winding trailing edge.

In some examples, the electrode assembly 120 may include three electrical/thermal path members. As an example, the electrical/thermal path members may include a first tab 124 extending downward from the first electrode plate 121 of the electrode assembly 120 and electrically/thermally coupled to the bottom portion 111 of the cylindrical can 110, the base finish part 1218 provided on the first electrode plate 121 of the electrode assembly 120 and electrically/thermally coupled to the side portion 112 of the cylindrical can 110, and a second tab 125 extending upward from the second electrode plate 122 of the electrode assembly 120 and electrically/thermally coupled to the cap assembly 140 (see FIG. 1B).

In some examples, the swelling tape 130 is positioned inside the electrode assembly 120 and presses the base finish part 1218 to the side portion 112 of the cylindrical can 110, thereby minimizing contact resistance between the base finish part 1218 and the side portion 112 of the cylindrical can 110. In some examples, the swelling tape 130 may be positioned on an inner side 1212 (see FIG. 3A) of the base finish part 1218. In some examples, the swelling tape 130 may be interposed between the base finish part 1218 and the separator 123.

In some examples, the horizontal length of the swelling tape 130 may be approximately 1% to approximately 100% of the horizontal length of the base finish part 1218. In some examples, the winding-turn length of the swelling tape 130 may be approximately 0.1-1 turn compared to the winding-turn length of the base finish part 1218. In some examples, "one turn" may refer to a length in which the base finish part 1218 or the first electrode plate 121 completely wraps the electrode assembly 120 by one turn.

In some examples, the swelling tape 130 may absorb an electrolyte to be swollen. For example, the volume of the swelling tape 130 after absorbing the electrolyte may be greater than the volume before absorbing the electrolyte. In some examples, the swelling tape 130 may include an acrylic binder that absorbs an electrolyte and increases in volume.

Figure 3A:
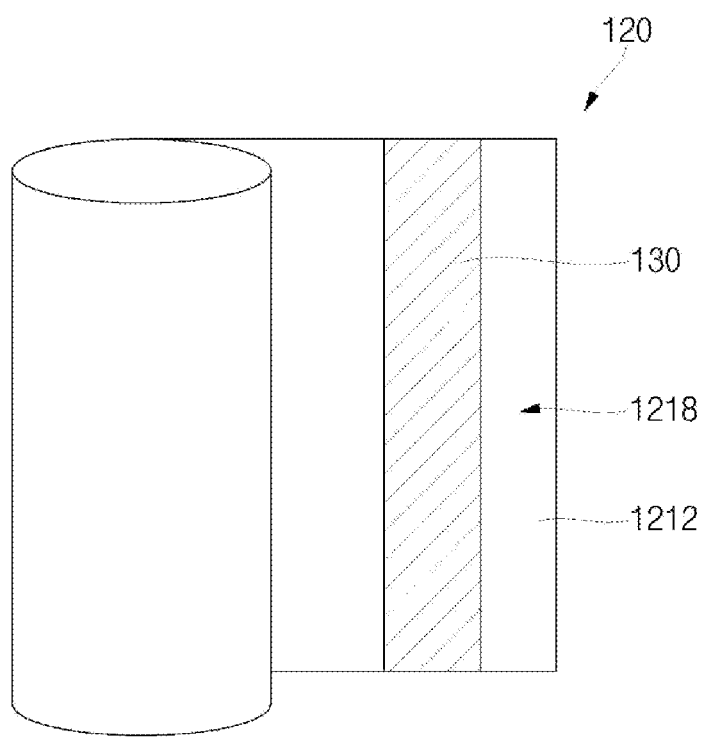
FIG. 3A is a view showing a state in which a base finish part of an exemplary electrode assembly of an exemplary secondary battery according to the present disclosure is unfolded.
Figure 3B:
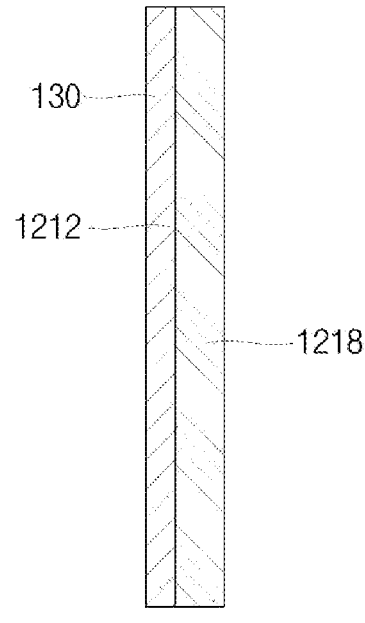
FIGS. 3B and 3C are cross-sectional views showing states before and after swelling of a swelling tape.
Figure 3C:
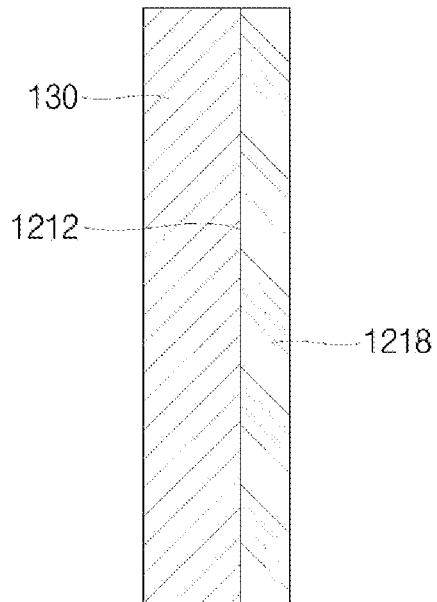

Referring to FIG. 3A, a view showing a state in which the base finish part 1218 of the electrode assembly 120 of the secondary battery 100 according to the present disclosure is unfolded is shown, and, referring to FIGS. 3B and 3C, cross-sectional views showing states before and after swelling of the swelling tape 130 are shown.

As shown in FIG. 3A, the swelling tape 130 may be attached to the inner surface 1212 of the base finish part 1218 and may have a substantially rectangular shape. The height (vertical height) of the swelling tape 130 may be equal to or less than the height (vertical height) of the base finish part 1218, and the length (horizontal length) of the swelling tape 130 may be equal to or less than the length (horizontal length) of the base finish part 1218.

As shown in FIGS. 3B and 3C, when the swelling tape 130 absorbs the electrolyte solution, for example, the thickness may increase. Therefore, before the electrolyte is injected, the electrode assembly 120 having the swelling tape 130 on the inside (i.e., the inner surface 1212 of the base finish part 1218) may be easily coupled to the inside of the cylindrical can 110, and when the electrolyte is injected later, the swelling tape 130 absorbs the electrolyte to be swollen, and thus, the base finish part 1218 of the electrode assembly 120 is strongly pressed to the side portion 112 of the cylindrical can 110. Accordingly, electrical contact resistance between the base finish part 1218 of the electrode assembly 120 and the side portion 112 of the cylindrical can 110 may be reduced. That is, by positioning the swelling tape 130 inside the electrode assembly 120, even if a deviation occurs in the winding radius of the electrode assembly 120, the secondary battery 100 capable of minimizing the contact resistance between the base finish part 1218 of the electrode assembly 120 and the cylindrical can 110 may be provided.

Figure 4A:
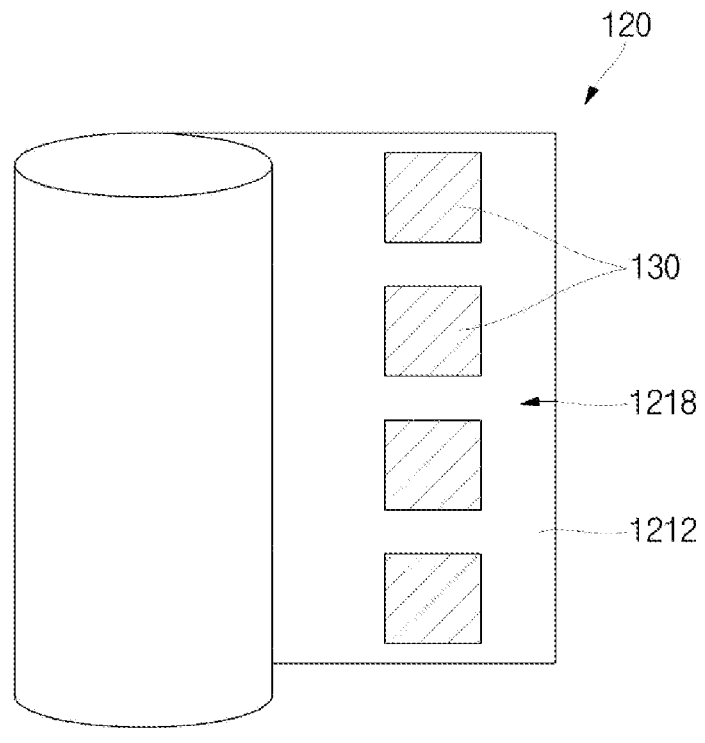
FIG. 4A is a view showing a state in which a base finish part of an exemplary electrode assembly of an exemplary secondary battery according to the present disclosure is unfolded.
Figure 4B:
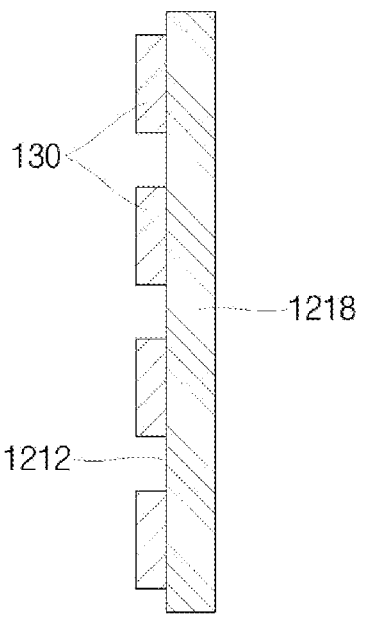
FIGS. 4B and 4C are cross-sectional views showing states before and after swelling of a swelling tape.
Figure 4C:
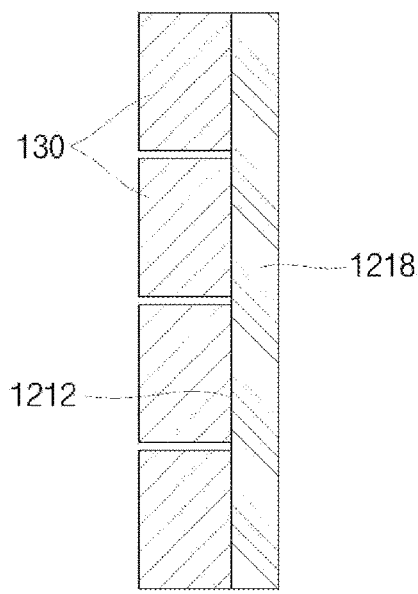

Referring to FIG. 4A, a view showing a state in which the base finish part 1218 of the electrode assembly 120 of the secondary battery 100 according to the present disclosure is unfolded is shown, and Referring to FIGS. 4B and 4C, cross-sectional views showing states before and after swelling of the swelling tape 130 are shown.

As shown in FIG. 4A, the swelling tape 130 may include multiple units. In some examples, multiple swelling tape units 130 may be attached to the inner surface 1212 of the base finish part 1218. In some examples, the multiple swelling tape units 130 may be arranged with a gap.

As shown in FIG. 4B, compared to the gap between the swelling tape units 130 before electrolyte absorption, as shown in FIG. 4C, the gap between the swelling tape units 130 after electrolyte absorption may be narrowed, and the thickness of the swelling tape units 130 after electrolyte absorption may also increase compared to the thickness of the swelling tape units 130 before electrolyte absorption.

As described above, since there is a gap between the swelling tape units 130, the electrolyte injection time is shortened and the swelling of the swelling tape units 130 also occurs quickly. Moreover, since there is a gap between the swelling tape units 130, it is possible to prevent a phenomenon in which specific areas of the swelling tape units 130 are excessively inflated or protrude after the electrolyte is injected from occurring.

Figure 5:
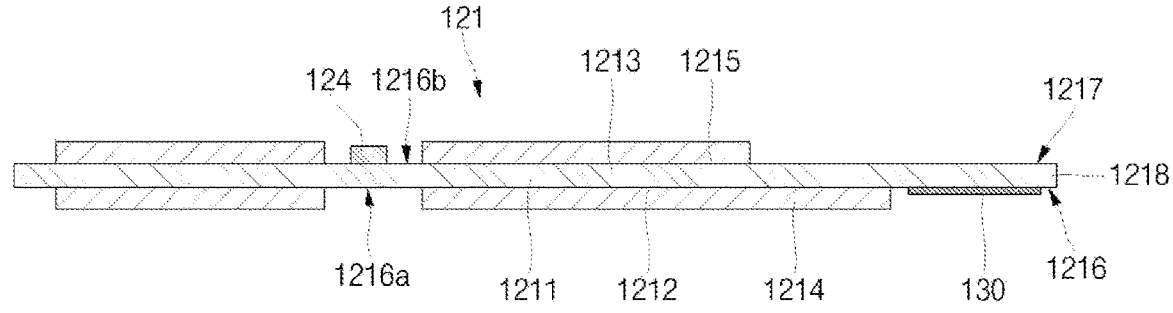
FIG. 5 is a cross-sectional view showing a state before winding of a first electrode plate of an exemplary electrode assembly of an exemplary secondary battery according to the present disclosure.

Referring to FIG. 5, a cross-sectional view showing a state before winding of a first electrode plate 121 of the electrode assembly 120 of the secondary battery 100 according to the present disclosure is shown.

As shown in FIG. 5, the first electrode plate 121 may include a conductive first base 1211 having an inner surface 1212 and an outer surface 1213, coating portions 1214 and 1215 provided by coating a first active material on an inner side 1212 and an outer side 1213 of the first base 1211, respectively, and non-coating portions 1216 and 1217 provided by not coating the first active material on the inner side 1212 and the outer side 1213 of the first base 1211, respectively. In some examples, the non-coating portions 1216 and 1217 may cover the outermost periphery of the electrode assembly 120. In some examples, the base finish part 1218 may include the non-coating portions 1216 and 1217. In some examples, the non-coating portions 1216 and 1217 may include the base finish part 1218. In some examples, the length of the non-coating portion 1217 may be greater than or equal to the length of the non-coating portion 1216. In some examples, the swelling tape 130 may be adhered to the inner surface (or the non-coating portion 1216) of the base finish part 1218. In some examples, the outer surface (or the non-coating portion 1217) of the base finish part 1218 may be in direct electrical/mechanical/thermal contact with the side portion 112 of the cylindrical can 110.

In some examples, the coating portion 1214 attached to the inner surface 1212 of the first base 1211 may be composed of two divided portions, and the coating portion 1215 attached to the outer surface 1213 of the first base 1211 may also be composed of two divided portions. In some examples, the two divided portions may be spaced apart from each other, and non-coating portions 1216a and 1216b may be provided therebetween. In some examples, the first tab 124 may be electrically connected to the non-coating portion 1216*b* between the two coating portions 1215. In some examples, the first tab 124 may be connected to the outer surface 1213 of the first base 1211. As described above, the first tab 124 may be electrically connected to the bottom portion 111 of the cylindrical can 110.

Meanwhile, the horizontal length of the swelling tape 130 may be approximately 1% to approximately 100% of the horizontal length of the non-coating portion 1216 (or base finish part 1218). In addition, the winding-turn length of the swelling tape 130 may be approximately 0.1-1 turn compared to the winding-turn length of the base finish part 1218 (or the non-coating portion 1216). In some examples, the thickness of the swelling tape 130 may be smaller than the thickness of the coating portion 1214 provided on the inner surface 1212 before absorbing the electrolyte, but may be greater than or equal to the thickness of the coating portion 1214 provided on the inner surface 1212 after absorbing the electrolyte.

Accordingly, after absorbing the electrolyte, the swelling tape 130 may strongly press the base finish part 1218 (or the non-coating portion 1217) to the side portion 112 of the cylindrical can 110. Therefore, current and/or heat can be efficiently transferred to the cylindrical can 110 through the base finish part 1218 of the electrode assembly 120.

While the foregoing embodiment is only one embodiment for carrying out the present disclosure, which is not limited to the embodiment, it will be understood by a person skilled in the art that various changes in form and details may be made therein without departing from the spirit and scope of the present disclosure as defined by the following claims.

The invention claimed is:

1. A secondary battery comprising:
a cylindrical can;
an electrode assembly having a base finish part electrically contacting the cylindrical can;
a cap assembly sealing the electrode assembly by blocking the cylindrical can; and
a swelling tape positioned inside the base finish part to press the base finish part to the cylindrical can.

2. The secondary battery as claimed in claim 1, wherein the can includes a bottom portion and a side portion extending from the bottom portion, and the swelling tape presses the base finish part to the side portion.

3. The secondary battery as claimed in claim 1, wherein the electrode assembly includes a first electrode plate, a separator positioned on the first electrode plate, and a second electrode plate positioned on the separator, wherein the first electrode plate, the separator, and the second electrode plate are laminated and wound, and the base finish part is provided by wrapping an outermost periphery of the electrode assembly with the first electrode plate.

4. The secondary battery as claimed in claim 3, wherein the first electrode plate includes a conductive first base having inner and outer surfaces, a coating portion provided by coating a first active material on the inner and the outer surfaces of the conductive first base, and a non-coating portion provided by not coating the first active material on the inner and the outer surfaces of the first conductive base, and the non-coating portion covers the outermost periphery of the electrode assembly.

5. The secondary battery as claimed in claim 4, wherein the base finish part includes the non-coating portion.

6. The secondary battery as claimed in claim 4, wherein the swelling tape is adhered to an inner surface of the base finish part.

7. The secondary battery as claimed in claim 6, wherein the swelling tape is interposed between the inner surface of the base finish part and the separator.

8. The secondary battery as claimed in claim 4, wherein the first electrode plate further includes a first tab welded to the conductive first base, and the first tab is electrically connected to the cylindrical can.

9. The secondary battery as claimed in claim 4, wherein a length of the swelling tape is 1% to 100% of a length of the non-coating portion.

10. The secondary battery as claimed in claim 4, wherein a winding-turn length of the swelling tape is 0.1-1 turn compared to a winding-turn length of the base finish part.

11. The secondary battery as claimed in claim 1, wherein the swelling tape absorbs an electrolyte to be swollen.

12. The secondary battery as claimed in claim 1, wherein the swelling tape includes an acrylic binder.

* * * * *